3,250,795
PENTAFLUOROPHENYL MERCURY
COMPOUNDS
Earl M. Potrafke, Arden, Del., assignor to E. I. du Pont
de Nemours and Company, Wilmington, Del., a corporation of Delaware
No Drawing. Filed Sept. 30, 1963, Ser. No. 312,285
6 Claims. (Cl. 260—433)

This invention relates to novel pentafluorophenyl mercury compounds. The new compounds of this invention are of the formula:

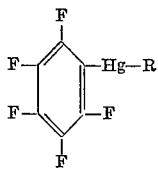

wherein R represents a member of the group consisting of alkyl, fluoroalkyl, cyclohexyl, fluorocyclohexyl, and phenyl. The pentafluorophenyl compounds of this invention have been found to be thermally stable. This desirable property and the unusually high densities of these compounds make them especially valuable for use as heat transfer media and instrument fluids, e.g., gyroscope fluids. They are also useful as dielectric compositions.

It is an object of this invention to provide novel pentafluorophenylmercury compounds. It is a further object to provide pentafluorophenylmercury compounds useful as instrument fluids. These and other objects will become apparent in the following description and claims.

More specifically, the present invention is directed to compounds of the formula

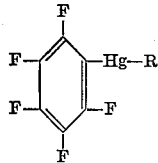

wherein R represents a member of the group consisting of $C_1$ to $C_6$ alkyl, $C_1$ to $C_6$ fluoroalkyl, cyclohexyl, fluorocyclohexyl, and phenyl.

Typical compounds within the scope of the invention include but are not limited to the following list of compounds which is given by way of example:

Methylpentafluorophenylmercury
Ethylpentafluorophenylmercury
Pentafluorophenylperfluoroisopropylmercury
Hexylpentafluorophenylmercury
Pentafluorophenylphenylmercury
Isobutylpentafluorophenylmercury
Cyclohexylpentafluorophenylmercury
4-fluorocyclohexylpentafluorophenylmercury The pentafluorophenylmercury compounds of this invention are prepared by reacting the Grignard reagent, pentafluorophenylmagnesium halide, with the appropriate alkyl or arylmercury chloride in tetrahydrofuran solution. The pentafluorophenylmagnesium chloride, bromide or iodide may be used. When using the chloride, care must be taken to maintain the temperature below 35° C.

The following are representative examples of the preparation of the compounds of the invention.

*Example 1.—Methylpentafluorophenylmercury*

Pentafluorophenylmagnesium chloride is prepared from magnesium (2.0 g., 0.082 mole), chloropentafluorobenzene (16.2 g., 0.080 mole) and tetrahydrofuran (100 cc.). Methylmercury chloride (20.0 g., 0.08 mole), dissolved in tetrahydrofuran (100 cc.), is added dropwise to the reagent, maintained at from about 3° to 8° C. The addition is completed in about 25 minutes. The reaction mixture is then stirred at from about 0° to 5° C. for about 15 minutes before allowing it to warm to room temperature and remain at room temperature for about 2 hours. The contents of the flask are carefully poured into water (1500 cc.) and the resulting mixture is extracted three times with methylene chloride (200 cc. portions). The methylene chloride is removed from the dried extracts by distillation at atmospheric pressure and the product distilled at reduced pressure. A waxy, colorless solid, weighing 18.3 g. (60% yield), is obtained; M.P. 33° C., B.P. 99° C./10 mm. Hg. The density of the material is 2.54 g./cc. at 40° C.

*Analysis.*—Calcd. for $C_6F_5HgCH_3$: C, 22.0; H, <0.1; F, 24.9; Hg, 52.4. Found: C, 21.8; H, 0.8; F, 23.8; Hg, 54.2.

*Example 2.—Ethylpentafluorophenylmercury*

Pentafluorophenylmagnesium chloride is prepared from magnesium (2.0 g., 0.082 mole), chloropentafluorobenzene (16.2 g., 0.080 mole) and tetrahydrofuran (100 cc.). Ethylmercury chloride (23.3 g., 0.088 mole), dissolved in tetrahydrofuran (180 cc.), is added dropwise to the reagent, maintained at from about 0° to 5° C. The addition is completed in about 25 minutes. The reaction mixture is then stirred at from about 0° to 5° C. for about 195 minutes before allowing it to warm to room temperature and remain at room temperature for about 64 hours. The contents of the flask are carefully poured into water (1000 cc.). An oil, more dense than water, is observed and removed. The water layer is extracted three times with ether (150 cc. portions) and the extracts are added to the oil. Ether is removed from this mixture by distillation at atmospheric pressure and the product distilled at reduced pressure. A colorless liquid, weighing 20.5 g. (65% yield), is obtained; B.P. 93°–94° C./3 mm. Hg. The density of the material is 2.4912 g./cc. at 25° C.

*Analysis.*—Calcd. for $C_6F_5HgC_2H_5$: C, 24.2; H, 1.3; F, 23.9 Hg, 50.6. Found: C, 24.0; H, 1.4; F, 23.8; Hg, 51.8.

*Example 3.—Phenylpentafluorophenylmercury*

Pentafluorophenylmagnesium chloride is prepared from magnesium (1.0 g., 0.041 mole), chloropentafluorobenzene (8.1 g., 0.040 mole), and tetrahydrofuran (50 cc.). Phenylmercury chloride (13.8 g., 0.044 mole) is dissolved in tetrahydrofuran (150 cc.) and the solution is added rapidly to the reagent at from about 0° to 5° C. The reaction mixture is slowly heated to reflux temperature and maintained in this condition for about 16 hours. The flask contents are then carefully poured into water (1000 cc.) and the resulting solution is extracted three times with ether (100 cc. portions). The ether is removed from the extract with the aid of a stream of nitrogen and the solid material obtained is recrystallized from cyclohexane. The white crystals resulting weigh 2.0 g. (11% yield); M.P. 159°–160° C.

*Analysis.*—Calcd. for $C_6F_5HgC_6H_5$: C, 32.4; H, 1.1; F, 21.4. Found: C, 33.0; H, 1.2; F, 21.2.

By following the details of the above examples, various hydrocarbon- and fluorohydrocarbonpentafluorophenylmercury compounds are obtained. Pentafluorophenylmagnesium bromide or iodide may also be used in place of the chloride. For instance, pentafluorophenylmagnesium bromide is reacted with isobutylmercury bromide, by following the method described in Example 1, to give isobutylpentafluorophenylmercury; pentafluorophenylmagnesium iodide is reacted with hexylmercury chloride to give hexylpentafluorophenylmercury; pentafluorophenylmagnesium chloride is reacted with 4-fluorocyclohexylmercury chloride to give 4-fluorocyclohexylpentafluorophenylmercury; pentafluorophenylmagnesium chloride is reacted with cyclohexylmercury chloride to give cyclohexylpentafluorophenylmercury and pentafluorophenylmagnesium chloride is reacted with perfluoroisopropylmercury chloride to give pentafluorophenylperfluoroisopropylmercury.

The pentafluorophenylmercury compounds of the invention may also be prepared by reacting pentafluorophenyllithium with an alkyl or arylmercury chloride.

The novel pentafluorophenylmercurials of the invention are thermally stable compounds. For instance, methylpentafluorophenylmercury remained unchanged when held at 200° C. for 24 hours, and ethylpentafluorophenylmercury showed no sign of decomposition after 24 hours at 250° C. This stability together with high density renders these compounds desirable as instrument compositions, e.g., in gyroscopes.

The compounds have valuable dielectric properties which enable them to be used as dielectric compositions in high frequency capacitors. For example, ethylpentafluorophenylmercury has a dielectric constant of 8.95 at 10,000 cycles per second and 9.2 at 100,000 cycles per second, as well as a low resistivity of about $8 \times 10^8$ ohm-cm. The higher melting compounds can be used to advantage in instruments which operate at elevated temperatures, both as instrument and dielectric compositions.

As many apparently widely different embodiments of the invention will from the foregoing be immediately obvious to one skilled in the art, it is to be understood that this invention is not limited to the specific embodiments thereof except as defined in the appended claims.

What is claimed is:
1. A compound of the formula:

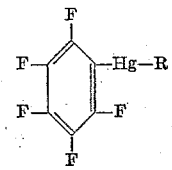

wherein R is selected from the group consisting of $C_1$ to $C_6$ alkyl, $C_1$ to $C_6$ fluoroalkyl, cyclohexyl, fluorocyclohexyl, and phenyl.

2. The compound of claim 1 wherein R is $C_1$ to $C_6$ alkyl.

3. The compound of claim 1 wherein R is $C_1$ to $C_6$ fluoroalkyl.

4. The compound of claim 1 wherein R is fluorocyclohexyl.

5. The compound of claim 1 wherein R is phenyl.

6. Methylpentafluorophenylmercury.

References Cited by the Examiner

UNITED STATES PATENTS 3,156,715  11/1964  Haszeldine et al. _____ 260—433

OTHER REFERENCES

Chambers et al.: J. Chem. Soc. (London) pages 4367–4371, November 1962.

TOBIAS E. LEVOW, *Primary Examiner.*